(12) United States Patent
Fukamachi

(10) Patent No.: US 11,387,021 B2
(45) Date of Patent: Jul. 12, 2022

(54) CERAMIC MEMBER AND ELECTRONIC DEVICE

(71) Applicant: Murata Manufacturing Co., Ltd., Nagaokakyo (JP)

(72) Inventor: Kohei Fukamachi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 24 days.

(21) Appl. No.: 17/079,566

(22) Filed: Oct. 26, 2020

(65) Prior Publication Data

US 2021/0043342 A1 Feb. 11, 2021

Related U.S. Application Data

(63) Continuation of application No. PCT/JP2019/019305, filed on May 15, 2019.

(30) Foreign Application Priority Data

Jul. 10, 2018 (JP) .............................. JP2018-130428

(51) Int. Cl.
*H01C 7/04* (2006.01)
*C04B 35/01* (2006.01)
(Continued)

(52) U.S. Cl.
CPC ........... *H01C 7/045* (2013.01); *C04B 35/016* (2013.01); *H01C 1/14* (2013.01); *H01C 17/06533* (2013.01); *C04B 2235/3227* (2013.01); *C04B 2235/3232* (2013.01); *C04B 2235/3263* (2013.01); *C04B 2235/442* (2013.01); *C04B 2235/768* (2013.01); *C04B 2235/9607* (2013.01)

(58) Field of Classification Search
CPC .................. H01C 7/045; H01C 1/1413; H01C 17/06533; H01C 17/06553; C04B 35/016; C04B 2235/3227

See application file for complete search history.

(56) References Cited

U.S. PATENT DOCUMENTS 4,562,124 A 12/1985 Ruka
5,820,995 A * 10/1998 Niimi .................... C04B 35/465
428/688

(Continued)

FOREIGN PATENT DOCUMENTS

CN 102211924 A 10/2011
GN 102464972 A 5/2012
(Continued)

OTHER PUBLICATIONS

JP 03-285314, Watanabe, machine translation. (Year: 1991).*
(Continued)

*Primary Examiner* — Kyung S Lee
(74) *Attorney, Agent, or Firm* — Keating & Bennett, LLP

(57) ABSTRACT

A ceramic member includes a perovskite compound including La, Ca, Mn, and Ti as main components, wherein the amount of Ti is about 5 parts by mole or more and about 20 parts by mole or less, the amount of Ca is about 10 parts by mole or more and about 27 parts by mole or less, and the total amount of La and Ca is about 85 parts by mole or more and about 97 parts by mole or less based on the total amount of Mn and Ti of 100 parts by mole.

17 Claims, 3 Drawing Sheets

(51) Int. Cl.
*H01C 1/14* (2006.01)
*H01C 17/065* (2006.01)

(56) References Cited

U.S. PATENT DOCUMENTS

| | | | |
|---|---|---|---|
| 9,318,684 B2* | 4/2016 | Koto | H01F 1/407 |
| 2003/0056584 A1* | 3/2003 | Park | G01F 1/692 |
| | | | 73/204.11 |
| 2005/0064731 A1 | 3/2005 | Park et al. | |
| 2011/0195178 A1* | 8/2011 | Kojima | C04B 35/4682 |
| | | | 427/126.3 |
| 2017/0106337 A1* | 4/2017 | Chiffey | B01D 53/944 |
| 2018/0166218 A1* | 6/2018 | Noda | H01G 4/224 |
| 2020/0161051 A1* | 5/2020 | Tanaka | H01G 4/12 |

FOREIGN PATENT DOCUMENTS

| | | |
|---|---|---|
| JP | 03-285314 A | 12/1991 |
| JP | 07-187841 A | 7/1995 |
| JP | 2575627 B2 | 1/1997 |
| JP | 10-214674 A | 8/1998 |
| JP | 2000-138103 A | 5/2000 |
| JP | 2005-512931 A | 5/2005 |
| JP | 2011-034997 A | 2/2011 |

OTHER PUBLICATIONS

Official Communication issued in International Patent Application No. PCT/JP2019/019305, dated Jul. 2, 2019.

J. Bredthauer, "Syntheses, lattice constants, magnetic properties and electrical conductivities of perovskite type solid solutions $La0.75EA0.25Mn(1-x)ZxO3$; EA = Ca, Sr, Ba; Z = Ru, Ti", Mat. Res. Bull., vol. 26, 1991, pp. 931-936.

Official Communication issued in corresponding Chinese Patent Application No. 201980042834.X dated May 17, 2022.

* cited by examiner

FIG. 1A
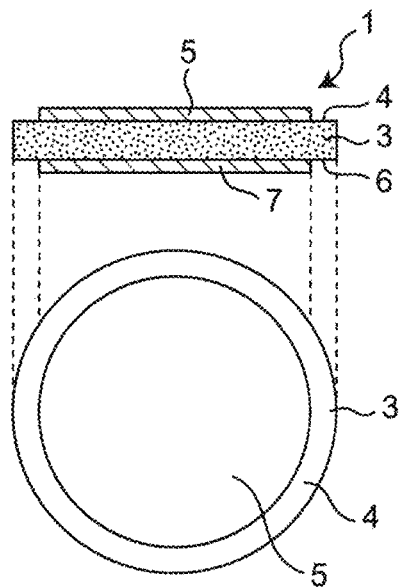
FIG. 1B
FIG. 2
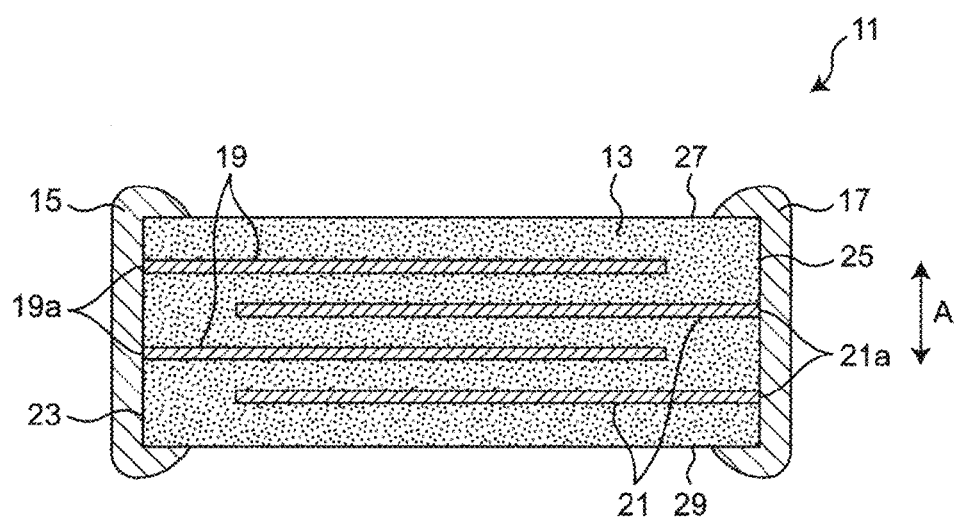

CERAMIC MEMBER AND ELECTRONIC DEVICE

CROSS REFERENCE TO RELATED APPLICATIONS

This application claims the benefit of priority to Japanese Patent Application No. 2018-130428 filed on Jul. 10, 2018 and is a Continuation Application of PCT Application No. PCT/JP2019/019305 filed on May 15, 2019. The entire contents of each application are hereby incorporated herein by reference.

BACKGROUND OF THE INVENTION

1. Field of the Invention

The present invention relates to a ceramic member and an electronic device.

2. Description of the Related Art

In recent years, in electric vehicles, hybrid vehicles and the like that have become popular, many modules and motors in which a large current is handled are used. In these modules and the like, when an inrush current is generated upon power-on (or start of the motor) and an excessive inrush current flows into the module or the like, electronic components or ICs inside the module or the like may be destroyed, and this problem has to be addressed. As a device for suppressing such an inrush current (resistive element), use of a thermistor device is under consideration.

In use of a thermistor device, the thermistor device is required to have excellent durability to inrush currents because an inrush current generated upon start of a motor of an electric vehicle reaches several hundred amperes, and the thermistor device is also required to have high reliability because the device is required to be operated at a relatively high temperature, for example, 120° C. to 250° C. Further, it is necessary that the device itself have low resistance, because if the device itself has high resistance, sufficient electric power cannot be transmitted to the motor, which causes the battery to be consumed. Therefore, it is preferable to use a material that has low resistance and in which the resistance sharply decreases at around 100° C. to 150° C. (that is, a material having a large B constant) as a thermistor material.

Conventionally, a Negative Temperature Coefficient (NTC) thermistor is known as a thermistor device for reducing the inrush current. The NTC thermistor has negative resistance-temperature characteristics. For example, an NTC thermistor including a ceramic member represented by the general formula $(La, AE)MnO_{3\pm\delta}$ (wherein AE is an alkaline earth metal such as Ba, Sr, or Ca) is known as such an NTC thermistor (for example, Japanese Patent Application Laid-Open No. 2000-138103 and Japanese Patent Application Laid-Open No. H10-214674). These NTC thermistors undergo a metal-insulator transition, and achieve lower resistance than in the case of a spinel manganese oxide at a temperature equal to or higher than the transition point (Curie temperature Tc).

Meanwhile, as for the NTC thermistors, the firing temperature may vary depending on the firing treatment conditions (more specifically, the type of the furnace used in the firing, the amount of the material to be fired that is introduced into the furnace, the arrangement of the material in the furnace, and the like), and as a result, variations in NTC thermistor characteristics (electric resistance value) may occur. From the viewpoint of stabilizing the quality of the NTC thermistor and improving the yield, it is required to improve the stability of the electric resistance value to the firing temperature (to reduce the firing temperature dependency of the electric resistance value).

However, according to a study performed by the inventor of preferred embodiments of the present invention, it was discovered that even when the ceramic member described in, for example, Japanese Patent Application Laid-Open No. 2000-138103 or Japanese Patent Application Laid-Open No. H10-214674 is applied to an NTC thermistor, it is difficult to obtain a device having reduced firing temperature dependency and having excellent negative resistance-temperature characteristics.

SUMMARY OF THE INVENTION

Preferred embodiments of the present invention provide ceramic members each used in an electronic device, the ceramic member having reduced firing temperature dependency and having excellent negative resistance-temperature characteristics, and electronic devices that each have reduced firing temperature dependency and excellent negative resistance-temperature characteristics.

As a result of intensive studies to solve the above-problem problem, the inventor of preferred embodiments of the present invention discovered that in a ceramic member including a perovskite compound including La, Ca, and Mn, Ca reduces the firing temperature dependency and reduces the B constant. The inventor of preferred embodiments of the present invention discovered that an addition of Ti to the ceramic member, and setting of the composition of the ceramic member, that is, the amount of Ti, the amount of Ca, and the total amount of La and Ca each within a predetermined range based on the total amount of Mn and Ti of 100 parts by mole may achieve both the reduction of firing temperature dependency and the retention of excellent negative resistance-temperature characteristics (prevention of reduction of the B constant), which are in a trade-off relationship, and developed preferred embodiments of the present invention. More specifically, the present invention includes the following preferred embodiments.

A ceramic member according to a preferred embodiment of the present invention includes a perovskite compound including La, Ca, Mn, and Ti as main components, and the amount of Ti is about 5 parts by mole or more and about 20 parts by mole or less, the amount of Ca is about 10 parts by mole or more and about 27 parts by mole or less, and the total amount of La and Ca is about 85 parts by mole or more and about 97 parts by mole or less based on the total amount of Mn and Ti of 100 parts by mole.

An electronic device according to a preferred embodiment of the present invention includes an element body including a ceramic member according to a preferred embodiment of the present invention and including two main surfaces, and electrodes each disposed on one of the main surfaces of the element body.

Further, an electronic device according to a preferred embodiment of the present invention includes an element body including a ceramic member according to a preferred embodiment of the present invention, an external electrode disposed on an outer surface of the element body, and an internal electrode disposed inside the element body and electrically connected to the external electrode.

Further, an electronic device according to a preferred embodiment of the present invention is, for example, a thermistor device.

According to preferred embodiments of the present invention, it is possible to provide ceramic members used in an electronic device as well as electronic devices, which each have reduced firing temperature dependency and each have excellent negative resistance-temperature characteristics.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 1A is a cross-sectional view showing an example of a single-layer NTC thermistor according to a preferred embodiment of the present invention. FIG. 1B is a front view showing an example of a single-layer NTC thermistor according to a preferred embodiment of the present invention.

FIG. 2 is a cross-sectional view showing an example of a laminated NTC thermistor according to a preferred embodiment of the present invention.

DETAILED DESCRIPTION OF THE PREFERRED EMBODIMENTS

Figure 3:
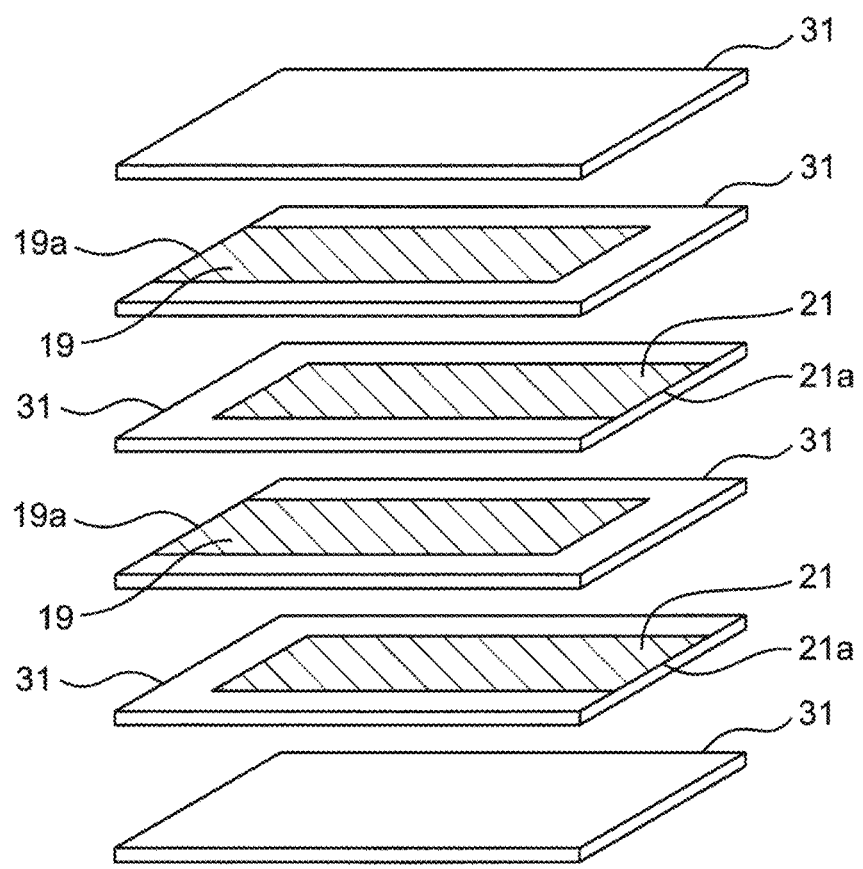
FIG. 3 is a perspective view showing a plurality of ceramic sheets for producing a laminate according to a preferred embodiment of the present invention.

Hereinafter, ceramic members and electronic devices according to preferred embodiments of the present invention will be described with reference to the drawings. The scope of the present invention is not limited to the preferred embodiments described herein, and various modifications can be made without departing from the spirit of the present invention. Further, when a plurality of upper limits and/or a plurality of lower limits are described for a specific parameter, it is possible to combine any of the upper limits with any of the lower limits among the upper limits and lower limits to provide a suitable numerical range.

Ceramic Member

A ceramic member according to a preferred embodiment of the present invention preferably includes, for example, a perovskite compound including La, Ca, Mn, and Ti as main components, and the amount of Ti is about 5 parts by mole or more and about 20 parts by mole or less, the amount of Ca is about 10 parts by mole or more and about 27 parts by mole or less, and the total amount of La and Ca is about 85 parts by mole or more and about 97 parts by mole or less based on the total amount of Mn and Ti of 100 parts by mole.

As used herein, the term "main component" means that the relevant atoms are present, based on the number of moles of all the analyzable atoms, in an amount of about 80 mol % or more, preferably about 90 mol % or more, more preferably about 95 mol % or more, and still more preferably about 99 mol % or more, for example. The composition of the ceramic member can be identified by a method known in the technical field of complex oxides. The content of the relevant atoms is measured by inductively coupled plasma atomic emission spectroscopy (ICP-AES).

The ceramic member includes a perovskite compound. The perovskite compound is an aggregate of a plurality of crystal grains of a complex oxide having a perovskite structure. The perovskite compound includes La, Ca, Mn, and Ti, and may further include O (oxygen atoms). The perovskite compound is represented by the general formula (1), for example:

$$La_{1-x-y}AE_y)(Mn_{1-z}Ti_z)O_{3\pm\delta} \tag{1}$$

$(0.03 \leq x \leq 0.15, 0.10 \leq y \leq 0.27,$ and $0.05 \leq z \leq 0.20)$

In the general formula (1), AE represents Ca.

In the present preferred embodiment, the amount of Ca preferably is about 10 parts by mole or more and about 27 parts by mole or less based on the total amount of Mn and Ti of 100 parts by mole. It is thought that when the amount of Ca is about 10 parts by mole or more and about 27 parts by mole or less, the electronic device characteristics of the carrier concentration (hole concentration) of the ceramic member, which is produced by Ca as an acceptor element in the ceramic member, may be more dominant than the electronic device characteristics derived from O (oxygen). Therefore, it is thought that the specific resistance of the ceramic member at room temperature is reduced and the firing temperature dependency of the ceramic member is also reduced.

In the present preferred embodiment, the amount of Ti is preferably about 5 parts by mole or more and about 20 parts by mole or less based on the total amount of Mn and Ti of 100 parts by mole. When the amount of Ti is about 5 parts by mole or more and about 20 parts by mole or less, a reduction of the B constant can be reduced or prevented because the crystal lattice of the ceramic member is enlarged and the energy of hopping conduction (hopping energy) is increased. From the viewpoint of further reducing the firing temperature dependency of the ceramic member, the amount of Ti is preferably about 18 parts by mole or less, for example. From the viewpoint of further preventing the reduction of the B constant of the ceramic member, the amount of Ti is preferably about 7 parts by mole or more.

In the present preferred embodiment, the total amount of La and Ca is preferably, for example, about 85 parts by mole or more and about 97 parts by mole or less based on the total amount of Mn and Ti of 100 parts by mole. When the total amount of La and Ca is about 85 parts by mole or more and about 97 parts by mole or less, the firing temperature dependency is reduced and the B constant is reduced or prevented from being reduced.

The composition of the ceramic member according to the present preferred embodiment can be adjusted by mixing predetermined amounts of raw materials including La, Ca, Mn, and Ti.

Method for Producing Ceramic Member

The ceramic member can be produced, for example, as follows.

A non-limiting example of a method for producing a ceramic member according to the present preferred embodiment includes a raw material production step of mixing and calcining raw materials to produce a ceramic raw material; a compact production step of molding the ceramic raw material to produce a compact; and a firing step of firing the compact based on a firing temperature profile to form a ceramic member.

In the raw material production step, first, a plurality of raw materials are weighed so that the amounts of Ca, La, Mn, and Ti may have a desired ratio in the ceramic member to be produced, and the raw materials are mixed and dried together with water and a dispersant to produce a mixture. Examples of the raw materials of the ceramic member include materials including calcium and oxygen as a Ca source (more specifically, oxides, carbonates such as calcium carbonate $CaCO_3$, and hydroxides), materials including lanthanum and oxygen as a La source (more specifically, oxides such as lanthanum oxide $La_2O_3$, carbonates, and hydroxides), materials including manganese and oxygen as a Mn source (more specifically, oxides such as manganese oxide $Mn_3O_4$, carbonates, and hydroxides), and materials including titanium and oxygen as a Ti source (more specifically, oxides such as titanium oxide $TiO_2$, carbonates, and hydroxides). Examples of the mixing and pulverizing device include a ball mill and an attritor. The raw materials as the starting materials may be in the form of a powder or a solution.

Then, the mixture is calcined, pulverized and mixed together with water, a dispersant, an organic binder, and a plasticizer, and dried using a spray dryer to produce a ceramic raw material. The calcination temperature is preferably about 750° C. or more and about 1100° C. or less. The mixture may be calcined in the air atmosphere or an oxygen atmosphere, for example. The calcination time is, for example, about 1 hour or more and about 10 hours or less, and is preferably about 2 hours or more and about 5 hours or less.

In the compact production step, the ceramic raw material (raw material powder) is filled in a mold and press-molded by a press molding method to produce a compact. Alternatively, in the compact production step, a green sheet (ceramic sheet) may be produced from a slurry by a green sheet forming method such as a doctor blade method, for example.

The firing step may include, for example, a degreasing treatment (more specifically, a binder removal treatment or the like). The degreasing temperature is preferably about 200° C. or more and about 400° C. or less, and is more preferably about 250° C. or more and about 350° C. or less, for example. The firing temperature (maximum firing temperature Tmax) is preferably about 1000° C. or more and about 1500° C. or less, and is more preferably about 1200° C. or more and about 1350° C., for example. The degreasing treatment and the firing treatment may be performed in the air atmosphere or an oxygen atmosphere, for example.

An example of the firing temperature profile will be described. The firing temperature profile includes a heating process, a high temperature holding process, and a cooling process. In the heating process, the firing temperature is increased from room temperature (about 25° C.) to a temperature T1 (for example, about 200° C. or more and about 400° C. or less) at a constant heating rate (for example, about 1° C./min or more and about 5° C./min or less, more specifically, about 3° C./min). Then, after the firing temperature reaches T1, the firing temperature is held at T1 for a predetermined time (for example, about 1 hour or more and about 12 hours or less) to degrease the compact. The firing temperature is increased from T1 to the maximum firing temperature Tmax (for example, about 1000° C. or more and about 1500° C. or less) at a constant heating rate (for example, about 3° C./min or more and about 7° C./min or less, more specifically, about 5° C./min). In the high temperature holding process, the firing temperature after reaching Tmax is held at Tmax for a predetermined time (for example, about 1 hour or more and about 5 hours or less). Then, in the cooling process, the firing temperature is decreased at a constant cooling rate (for example, several degrees per minute, more specifically, about 1° C./min to about 3° C./min).

A ceramic member according to a preferred embodiment can be used as a member of an electronic device. In particular, the ceramic member according to the present preferred embodiment is suitable for use as a member for a thermistor device (NTC thermistor), for example, as an element body for a thermistor device, since the ceramic member exhibits NTC characteristics.

Electronic Device

An electronic device according to a preferred embodiment of the present invention, when used as a thermistor device, can be particularly suitably used as an NTC thermistor to reduce the inrush current, because the electronic device has excellent flexural strength, and further has basic properties of an electronic device (low resistance and excellent electrical characteristics). Examples of the NTC thermistor include a single-plate NTC thermistor and a laminated NTC thermistor.

Single-Plate NTC Thermistor

A single-plate NTC thermistor includes an element body including the ceramic member and including two main surfaces, and electrodes each disposed on one of the main surfaces of the element body. The electrodes are at least two electrodes that sandwich at least a portion of the element body. A single-plate NTC thermistor device will be described with reference to FIGS. 1A and 1B. FIG. 1A is a cross-sectional view showing an example of a single-plate NTC thermistor. FIG. 1B is a front view showing an example of the NTC thermistor according to a preferred embodiment of the present invention. A single-plate NTC thermistor device 1 includes an element body 3 including a ceramic member according to a preferred embodiment of the present invention, and a first electrode 5 and a second electrode 7 disposed to face each other with the element body 3 interposed therebetween. The element body 3 includes two main surfaces (a first main surface 4 and a second main surface 6). The element body 3 has a cylindrical or substantially cylindrical shape as shown in FIGS. 1A and 1B, but the shape is not limited thereto. Examples of other shapes of the element body 3 include a rectangular or substantially rectangular plate shape. The first electrode 5 is disposed on the first main surface 4. The second electrode 7 is disposed on the second main surface 6.

The material used for the electrodes is not particularly limited, and the electrodes are made a conductive material, preferably at least one metal material selected from the group consisting of Au, Ag, Pd, Ni, Cu, Sn, and alloys of these metals, for example. In a preferred embodiment, the material is preferably Ag, for example.

Laminated NTC Thermistor Device

A laminated NTC thermistor includes an element body including a ceramic member according to a preferred embodiment of the present invention, an external electrode disposed on an outer surface of the element body, and an internal electrode disposed inside the element body and electrically connected to the external electrode. A laminated NTC thermistor will be described with reference to FIG. 2. FIG. 2 is a cross-sectional view showing an example of a laminated NTC thermistor. A laminated NTC thermistor device 11 includes an element body 13, a first external electrode 15 and a second external electrode 17 disposed on the outer surface of the element body 13, and first internal electrodes 19 and second internal electrodes 21 disposed inside the element body 13 and electrically connected to the first external electrode 15 and the second external electrode 17, respectively.

The element body 13 includes a ceramic member according to a preferred embodiment of the present invention. The element body 13 has a rectangular or substantially rectangular parallelepiped shape, but the shape is not limited thereto.

The first external electrode 15 is disposed on the outer surface of the element body 13. Specifically, the first external electrode 15 is disposed on a first end surface 23 of the element body 13, and is further disposed on a portion of a first side surface 27 and a portion of a second side surface 29 of the element body 13. The second external electrode 17 is disposed on the outer surface of the element body 13. Specifically, the second external electrode 17 is disposed on a second end surface 25 of the element body 13, and is further disposed on a portion of the first side surface 27 and a portion of the second side surface 29 of the element body 13. The first external electrode 15 and the second external electrode 17 are disposed so as to face each other. The first external electrode 15 and the second external electrode 17 are preferably made of, for example, Ag.

The first internal electrodes 19 and the second internal electrodes are disposed inside the element body 13. Specifically, the first internal electrodes 19 and the second internal electrodes 21 are disposed parallel or substantially parallel to each other at a predetermined interval inside the element body 13. The plurality of first internal electrodes 19 and the plurality of second internal electrodes 21 are alternately disposed in the stacking direction (direction of arrow A in FIG. 2) inside the element body 13. Each of the first internal electrodes 19 and each of the second internal electrodes 21 face each other with a portion of the element body 13 interposed therebetween. The first internal electrodes 19 are electrically connected to the first external electrode 15. The second internal electrodes 21 are electrically connected to the second external electrode 17. Specifically, ends 19a of the first internal electrodes contact the first external electrode 15 so that the first internal electrodes 19 and the first external electrode 15 are electrically connected to each other. Ends 21a of the second internal electrodes contact the second external electrode 17 so that the second internal electrodes 21 and the second external electrode 17 are electrically connected to each other.

Method for Producing Electronic Device

Hereinafter, a non-limiting example of a method for producing the electronic device according to the present preferred embodiment will be described.

The method for producing an electronic device according to a preferred embodiment includes an element body production step of producing an element body that is the ceramic member; and an electrode forming step of forming electrodes on the surface of the element body. As examples of the method for producing an electronic device, methods for producing an NTC thermistor will be described below separately for a single-plate NTC thermistor and a laminated NTC thermistor.

Method for Producing Single-Plate NTC Thermistor

The element body production step is the same or substantially the same as the above-mentioned method for producing a ceramic member. As an electrode forming method, for example, a CVD method, electrolytic plating, electroless plating, vapor deposition, sputtering, baking of a conductive paste or the like can be used, and baking of a conductive paste is preferably used. In the baking of a conductive paste, a conductive paste is applied to the surfaces of the element body to form conductive films, and the conductive films are baked to form a pair of electrodes (external electrodes). The method of applying the conductive paste may be a known method (more specifically, screen printing or the like, for example). The conductive paste includes a conductive material (more specifically, Ag, Pd, Ag—Pd or the like). The baking temperature is preferably about 500° C. or more and about 900° C. or less, for example. The conductive paste may be baked in the air atmosphere or an oxygen atmosphere, for example.

Method for Producing Laminated NTC Thermistor

The element body production step further includes a laminate forming step of producing green sheets in the compact production step of the above-described method for producing a ceramic member, applying a conductive paste to the green sheets by screen printing, for example, and stacking the green sheets with the conductive paste to form a laminate.

Figure 4:
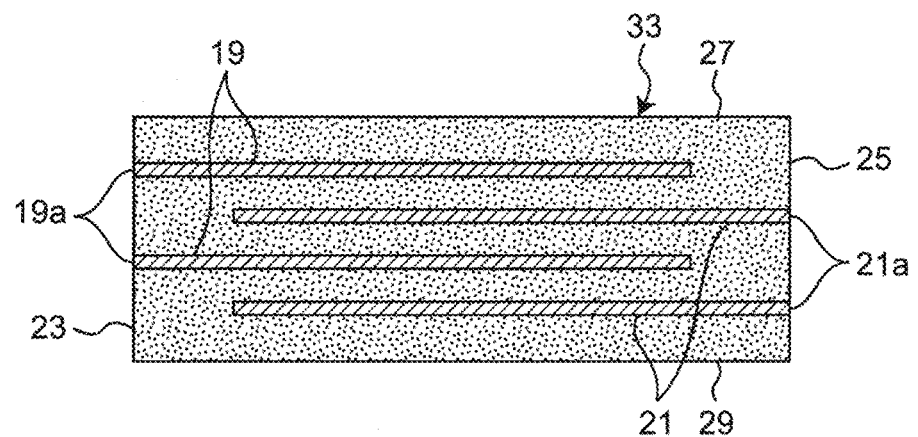
FIG. 4 is a cross-sectional view of a laminate according to a preferred embodiment of the present invention.

The laminate forming step in the element body production step will be described with reference to FIGS. 3 and 4. FIG. 3 is a perspective view showing a plurality of ceramic sheets for producing a laminate. FIG. 4 is a cross-sectional view of a laminate. In the laminate forming step, sheet-shaped compacts (ceramic sheets 31), ceramic sheets 31 each including a first internal electrode 19, and ceramic sheets 31 each including a second internal electrode 21 are prepared. As shown in FIG. 3, the ceramic sheets 31 are stacked so that the first internal electrodes 19 and the second internal electrodes 21 are alternately stacked. Further, the ceramic sheets 31 are stacked so that a plurality of ends 19a of the first internal electrodes may be disposed at a constant interval on a first end surface 23 of a laminate 33 shown in FIG. 4, and a plurality of ends 21a of the second internal electrodes may be disposed at a constant interval on a second end surface 25 of the laminate 33 shown in FIG. 4.

Then, the stacked ceramic sheets are pressure-bonded with a press to produce the laminate 33 shown in FIG. 4. The ends 19a of the first internal electrodes are exposed from the first end surface 23, and the ends 21a of the second internal electrodes are exposed from the second end surface 25. The element body 13 shown in FIG. 2 is obtained through the firing step of firing the laminate 33.

The electrode forming step will be described with reference to FIG. 2. In the electrode forming step, the first external electrode 15 is formed so as to cover the entire or substantially the entire first end surface 23, a portion of the first side surface 27, and a portion of the second side surface 29 of the element body 13. Further, the second external electrode 17 is formed so as to cover the entire or substantially the entire second end surface 25, a portion of the first side surface 27, and a portion of the second side surface 29 of the element body 13. The electrode forming method is the same or substantially the same as the electrode forming method in the above-described method for producing a single-plate NTC thermistor.

EXAMPLES

Hereinafter, ceramic members and electronic devices according to preferred embodiments of the present invention will be described in more detail with reference to examples. However, the present invention is not limited to the scope of the examples.

1. Production of Samples

Example 1: Production of Ceramic Member and Thermistor Device of Sample No. 2

A ceramic member and an inrush current suppression device were produced by the following method.

Powders of manganese oxide ($Mn_3O_4$), calcium carbonate ($CaCO_3$), lanthanum oxide ($La_2O_3$), and titanium oxide ($TiO_2$) each having a purity of about 99.9% or more were used as raw materials of the element body. These raw materials were weighed so that the composition of the raw materials in the ceramic member after firing might be an amount of Ca of about 10 parts by mole, a total amount of La and Ca of about 89 parts by mole, and an amount of Ti of about 5 parts by mole based on the total amount of Mn and Ti of 100 parts by mole.

These weighed raw materials were put into a ball mill together with partially stabilized zirconium oxide balls (PSZ balls), pure water, and a dispersant, sufficiently mixed and pulverized by a wet method, and dried to produce a mixed powder. The obtained mixed powder was calcined at a temperature of about 850° C. to give a calcined powder. To the obtained calcined powder, PSZ balls, water, a dispersant, an organic binder, and a plasticizer were added, and the resulting mixture was pulverized and mixed to produce a slurry. The obtained slurry was spray-dried to produce a raw material powder. The obtained raw material powder was filled in a mold and press-molded to produce a compact. The compact had a cylindrical or substantially cylindrical shape. The size of the compact was adjusted to be about 22 mm in diameter and about 1.0 mm in thickness. The obtained compact was degreased at about 300° C. in the air atmosphere. Then, the compact was subsequently fired at a maximum firing temperature of about 1250° C. in the air atmosphere to produce a ceramic element body (ceramic member). As a result, a ceramic element body (Sample No. 2, Example 1) produced at two different firing temperatures was obtained.

Then, an Ag paste was applied by screen printing to both surfaces (substantially circular surfaces) of the ceramic element body, and baked by a heat treatment at about 700° C. to form electrodes, and thus a thermistor device for evaluating the inrush current was produced. As a result, a thermistor device (Sample No. 2, Example 1) produced at two different firing temperatures was obtained. The firing temperature profile was as follows: a heating rate of about 3° C./min, a holding time of about 3 hours at a degreasing treatment temperature of about 300° C., a heating rate of about 5° C./min, a holding time of about 4 hours at a firing temperature of about 1250° C., and a cooling rate of about 5° C./min. Further, a ceramic element body and a thermistor device were produced in the same or similar manner except that the maximum firing temperature was changed from about 1250° C. to about 1300° C.

Production of Ceramic Members and Thermistor Devices of Examples 2 to 20 and Comparative Examples 1 to 9

The ceramic members and the thermistor devices of Examples 2 to 20 and Comparative Examples 1 to 9 were produced by a method similar to that for the ceramic member and the thermistor device of Example 1 except that the composition of the ceramic member after firing was changed to the amount of Ca, the total amount of La and Ca, and the amount of Ti shown in Table 1 from the amount of Ca of about 10 parts by mole, the total amount of La and Ca of about 89 parts by mole, and the amount of Ti of about 5 parts by mole based on the total amount of Mn and Ti of 100 parts by mole.

2. Measurement Methods 2-1. Composition and Contents of Elemental Components of Ceramic Members An elemental analysis by inductively coupled plasma atomic emission spectroscopy (ICP-AES) was performed to identify the composition of the ceramic members, and it was determined that the ceramic members had the contents of elemental components shown in Table 1. The contents of elemental components shown in Table 1 are values calculated from the starting materials, and it was confirmed by the elemental analysis that these contents of elemental components coincide with the contents of the elemental components in the ceramic members.

3. Evaluation Methods 3-1. Evaluation of Firing Temperature Dependency: Method for Measuring Change Rate of Electric Resistance Value The obtained ceramic device was subjected to the measurement of electric resistance value at room temperature (about 25° C.) using a nano voltmeter (Agilent 34420A).

From the obtained electric resistance value, the change rate $\Delta R_T$ (unit: %) of the electric resistance value was calculated using the following formula (1).

$$\Delta R_T = \frac{(R_{T2} - R_{T1})}{R_{T1}} \times 100 \qquad (1)$$

In the formula (1), $R_{T1}$ represents the electric resistance value (unit: Ω) of the thermistor device produced at the maximum firing temperature of about 1250° C., and $R_{T2}$ represents the electric resistance value (unit: Ω) of the thermistor device produced at the maximum firing temperature of about 1300° C.

The obtained change rate is shown in Table 1. The smaller the absolute value of the change rate is, the lower the firing temperature dependency of the thermistor device is. Specifically, it was determined that the thermistor device had low firing temperature dependency when the change rate was about −18% or more and about 18% or less.

3-2. Evaluation of Negative Resistance-Temperature Characteristics: Method for Calculating B Constant The ceramic device produced at the maximum firing temperature of about 1250° C. was subjected to the measurement of electric resistance value at about 100° C. in the same or similar manner as in the item 3-1.

From the obtained electric resistance value, the B constant was calculated using the following formula (2).

$$B = \ln\left\{\frac{R100}{R25} \bigg/ \left(\frac{1}{T1} - \frac{1}{T2}\right)\right\} \qquad (2)$$

In the formula (2), R100 represents the electric resistance value (unit: Ω) measured at a temperature T1 (about 100° C.), and R25 represents the electric resistance value (unit: Ω) measured at a temperature T2 (about 25° C.). T1 represents a measurement temperature (unit: K), and T2 represents a measurement temperature (unit: K).

The obtained B constant is shown in Table 1. It is shown that the larger the B constant is, the more excellent the negative resistance-temperature characteristics of the device is. Specifically, a device having a B constant of about 2000 K or more was determined to have excellent negative resistance-temperature characteristics.

Further, in the electronic devices of Examples 1 to 20, the change rate ΔRT was about −18% or more and about 18% or less, and the B constant was about 2000 K or more.

As for the ceramic members and the electronic devices of Sample Nos. 1, 6, 15 to 18, and 27 to 29 (Comparative Examples 1 to 9), in the ceramic members and the electronic devices of Comparative Examples 3 to 7, the amount of Ca was less than about 10 parts by mole or more than about 27 parts by mole based on the total amount of Mn and Ti of 100 parts by mole. In the ceramic members and the electronic devices of Comparative Examples 1 to 2 and 7 to 9, the amount of Ti was less than about 5 parts by mole or more than about 20 parts by mole based on the total amount of Mn and Ti of 100 parts by mole.

Further, in the electronic devices of Comparative Examples 2 and 5 to 7, the change rate ΔRT was less than

TABLE 1

| Sample No. | | Composition [mol] | | | | | Firing temperature dependency | Negative resistance-temperature characteristics |
|---|---|---|---|---|---|---|---|---|
| | | La | Ca | Mn | Ti | La + Ca | Mn + Ti | $\Delta R_T$ [%] | B constant [K] |
| 1 | Comparative Example 1 | 79 | 10 | 99 | 1 | 89 | 100 | 0.9 | 1792 |
| 2 | Example 1 | 79 | 10 | 95 | 5 | 89 | 100 | 3.4 | 2018 |
| 3 | Example 2 | 79 | 10 | 90 | 10 | 89 | 100 | 2.4 | 2433 |
| 4 | Example 3 | 79 | 10 | 85 | 15 | 89 | 100 | 0.2 | 2378 |
| 5 | Example 4 | 79 | 10 | 80 | 20 | 89 | 100 | −14.3 | 2404 |
| 6 | Comparative Example 2 | 79 | 10 | 70 | 30 | 89 | 100 | −128.0 | 2104 |
| 7 | Example 5 | 71 | 19 | 95 | 5 | 90 | 100 | −2.5 | 2020 |
| 8 | Example 6 | 71 | 19 | 90 | 10 | 90 | 100 | −12.1 | 2202 |
| 9 | Example 7 | 71 | 19 | 85 | 15 | 90 | 100 | −14.1 | 2290 |
| 10 | Example 8 | 71 | 19 | 80 | 20 | 90 | 100 | −16.2 | 2356 |
| 11 | Example 9 | 63 | 27 | 95 | 5 | 90 | 100 | −7.1 | 2005 |
| 12 | Example 10 | 63 | 27 | 90 | 10 | 90 | 100 | −12.4 | 2033 |
| 13 | Example 11 | 63 | 27 | 85 | 15 | 90 | 100 | −12.9 | 2109 |
| 14 | Example 12 | 63 | 27 | 80 | 20 | 90 | 100 | −14.4 | 2366 |
| 15 | Comparative Example 3 | 60 | 30 | 95 | 5 | 90 | 100 | −1.7 | 1793 |
| 16 | Comparative Example 4 | 60 | 30 | 90 | 10 | 90 | 100 | −9.8 | 1821 |
| 17 | Comparative Example 5 | 60 | 30 | 85 | 15 | 90 | 100 | −18.9 | 2080 |
| 18 | Comparative Example 6 | 60 | 30 | 80 | 20 | 90 | 100 | −21.2 | 2303 |
| 19 | Example 13 | 58 | 27 | 95 | 5 | 85 | 100 | −2.1 | 2006 |
| 20 | Example 14 | 58 | 27 | 90 | 10 | 85 | 100 | −9.9 | 2033 |
| 21 | Example 15 | 58 | 27 | 85 | 15 | 85 | 100 | −11.2 | 2255 |
| 22 | Example 16 | 58 | 27 | 80 | 20 | 85 | 100 | −13.6 | 2329 |
| 23 | Example 17 | 70 | 27 | 95 | 5 | 97 | 100 | −3.9 | 2040 |
| 24 | Example 18 | 70 | 27 | 90 | 10 | 97 | 100 | −11.1 | 2102 |
| 25 | Example 19 | 70 | 27 | 85 | 15 | 97 | 100 | −12.1 | 2149 |
| 26 | Example 20 | 70 | 27 | 80 | 20 | 97 | 100 | −14.8 | 2290 |
| 27 | Comparative Example 7 | 87 | 3 | 100 | 0 | 90 | 100 | 29.4 | 2535 |
| 28 | Comparative Example 8 | 79 | 10 | 100 | 0 | 89 | 100 | −0.1 | 1825 |
| 29 | Comparative Example 9 | 63 | 27 | 100 | 0 | 90 | 100 | −3.1 | 1573 |

The ceramic members and the electronic devices of Sample Nos. 2 to 5, 7 to 14, and 19 to 26 (Examples 1 to 20) included a perovskite compound including La, Ca, Mn, and Ti as main components, and the amount of Ti was about 5 parts by mole or more and about 20 parts by mole or less, the amount of Ca was about 10 parts by mole or more and about 27 parts by mole or less, and the total amount of La and Ca was about 85 parts by mole or more and about 97 parts by mole or less based on the total amount of Mn and Ti of 100 parts by mole.

about −18% or more than about 18%. In Comparative Examples 1, 3 to 4, and 8 to 9, the B constant was less than about 2000 K. Therefore, in the electronic devices of Comparative Examples 1 to 9, the change rate ΔRT was less than about −18% or more than about 18%, and/or the B constant was less than about 2000 K.

It is clear that the electronic devices including the ceramic members of Examples 1 to 20 have lower firing temperature dependency than that of the electronic devices including the ceramic members of Comparative Examples 1 to 9 and have excellent negative resistance-temperature characteristics.

The ceramic materials according to preferred embodiments of the present invention can each be used as a material that defines a thermistor device to reduce the inrush current, but the application is not limited thereto.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A thermistor device comprising:
   an element body including a ceramic member and electrodes; wherein
   the ceramic member includes a perovskite compound including La, Ca, Mn, and Ti as main components; and
   an amount of Ti is about 5 parts by mole or more and about 20 parts by mole or less, an amount of Ca is about 10 parts by mole or more and about 27 parts by mole or less, and a total amount of La and Ca is about 85 parts by mole or more and about 97 parts by mole or less based on a total amount of Mn and Ti of 100 parts by mole.

2. The ceramic member according to claim 1, wherein the amount of Ti is about 18 parts by mole or less.

3. The ceramic member according to claim 1, wherein the amount of Ti is about 7 parts by mole or more.

4. The electronic device according to claim 1, wherein the electronic device is a single-plate NTC thermistor device.

5. The thermistor device according to claim 1, wherein the thermistor device is a laminated NTC device.

6. An electronic device comprising:
   an element body including a ceramic member and two main surfaces; and
   electrodes each disposed on one of the two main surfaces of the element body; wherein
   the ceramic member includes a perovskite compound including La, Ca, Mn, and Ti as main components; and
   an amount of Ti is about 5 parts by mole or more and about 20 parts by mole or less, an amount of Ca is about 10 parts by mole or more and about 27 parts by mole or less, and a total amount of La and Ca is about 85 parts by mole or more and about 97 parts by mole or less based on a total amount of Mn and Ti of 100 parts by mole.

7. The electronic device according to claim 6, wherein the electronic device is a thermistor device.

8. The electronic device according to claim 6, wherein the amount of Ti is about 18 parts by mole or less.

9. The electronic device according to claim 6, wherein the amount of Ti is about 7 parts by mole or more.

10. The electronic device according to claim 6, wherein the electronic device is a single-plate NTC thermistor device.

11. The electronic device according to claim 6, wherein the electronic device is a laminated NTC thermistor device.

12. An electronic device comprising:
    an element body including a ceramic member;
    an external electrode disposed on an outer surface of the element body; and
    an internal electrode disposed inside the element body and electrically connected to the external electrode; wherein
    the ceramic member includes a perovskite compound including La, Ca, Mn, and Ti as main components; and
    an amount of Ti is about 5 parts by mole or more and about 20 parts by mole or less, an amount of Ca is about 10 parts by mole or more and about 27 parts by mole or less, and a total amount of La and Ca is about 85 parts by mole or more and about 97 parts by mole or less based on a total amount of Mn and Ti of 100 parts by mole.

13. The electronic device according to claim 12, wherein the electronic device is a thermistor device.

14. The electronic device according to claim 12, wherein the amount of Ti is about 18 parts by mole or less.

15. The electronic device according to claim 12, wherein the amount of Ti is about 7 parts by mole or more.

16. The electronic device according to claim 12, wherein the electronic device is a single-plate NTC thermistor device.

17. The electronic device according to claim 12, wherein the electronic device is a laminated NTC thermistor device.

* * * * *